(12) United States Patent
Smith

(10) Patent No.: US 12,351,109 B2
(45) Date of Patent: *Jul. 8, 2025

(54) VIDEO DISPLAY FOR REFUSE COLLECTION

(71) Applicant: The Heil Co., Chattanooga, TN (US)

(72) Inventor: John Forrest Smith, Fort Payne, AL (US)

(73) Assignee: The Heil Co., Chattanooga, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,222

(22) Filed: May 3, 2024

(65) Prior Publication Data

US 2024/0278724 A1    Aug. 22, 2024

Related U.S. Application Data

(63) Continuation of application No. 17/578,914, filed on Jan. 19, 2022, now Pat. No. 11,999,300.

(Continued)

(51) Int. Cl.
| | | |
|---|---|---|
| *B60R 1/25* | (2022.01) | |
| *B60K 35/00* | (2006.01) | |
| *B60R 11/04* | (2006.01) | |
| *B65F 3/02* | (2006.01) | |
| *G02B 27/01* | (2006.01) | |
| *H04N 7/18* | (2006.01) | |
| *B60K 35/23* | (2024.01) | |

(52) U.S. Cl.
CPC ............... *B60R 1/25* (2022.01); *B60K 35/00* (2013.01); *B60R 11/04* (2013.01); *B65F 3/0213* (2013.01); *G02B 27/0101* (2013.01); *H04N 7/181* (2013.01); *H04N 7/188* (2013.01); *B60K 35/23* (2024.01); *B60K 2360/334* (2024.01); *B60R 2300/105* (2013.01); *B60Y 2200/144* (2013.01); *B65F 2003/023* (2013.01); *G02B 2027/0138* (2013.01)

(58) Field of Classification Search
CPC . B60R 1/25; B60R 11/04; B60K 35/00; B65F 3/0213; G02B 27/0101; H04N 7/181; H04N 7/188
USPC ........................................................ 348/148
See application file for complete search history.

(56) References Cited

U.S. PATENT DOCUMENTS

| | | |
|---|---|---|
| 5,005,009 A | 4/1991 | Roberts |
| 11,630,201 B2 | 4/2023 | Koga et al. |

(Continued)

FOREIGN PATENT DOCUMENTS

| | | |
|---|---|---|
| JP | 2004-258900 | 9/2004 |
| KR | 10-2019-0031214 | 3/2019 |

OTHER PUBLICATIONS

International Search Report and Written Opinion in International Appln. No. PCT/US2021/015586, dated Oct. 19, 2021, 11 pages.

*Primary Examiner* — Matthew David Kim
(74) *Attorney, Agent, or Firm* — Fish & Richardson P.C.

(57) ABSTRACT

A refuse collection vehicle includes a grabber that is operable to engage a refuse container, a lift arm coupled to the grabber and operable to raise and lower the grabber, a camera that is arranged to generate video data of a scene external to the refuse collection vehicle, and a semi-transparent display device configured to display the video data generated by the camera, wherein the semi-transparent display is positioned within a forward line of sight of an operator of the refuse collection vehicle.

18 Claims, 10 Drawing Sheets

Related U.S. Application Data

(60) Provisional application No. 63/142,380, filed on Jan. 27, 2021.

(56) References Cited

U.S. PATENT DOCUMENTS

| | | | |
|---|---|---|---|
| 2003/0031543 A1* | 2/2003 | Elbrink | B65F 3/02 414/408 |
| 2008/0291032 A1* | 11/2008 | Prokhorov | B60K 35/10 340/576 |
| 2009/0251328 A1* | 10/2009 | Ikunami | B60R 11/0235 340/691.1 |
| 2011/0181540 A1* | 7/2011 | Nakamura | G01C 21/265 345/173 |
| 2013/0265251 A1* | 10/2013 | Arakawa | G06F 3/04812 345/173 |
| 2015/0246613 A1* | 9/2015 | Shimazu | B60K 35/29 340/439 |
| 2016/0142685 A1* | 5/2016 | Aoki | H04N 23/90 348/148 |
| 2016/0196748 A1* | 7/2016 | Yellambalase | G08G 1/166 340/435 |
| 2017/0318267 A1 | 11/2017 | Kim et al. | |
| 2018/0088323 A1* | 3/2018 | Bao | G02B 27/017 |
| 2018/0297522 A1 | 10/2018 | Omanovic et al. | |
| 2019/0116315 A1* | 4/2019 | Satomi | H04N 23/90 |
| 2020/0064944 A1* | 2/2020 | Chi | G06F 3/04883 |
| 2020/0339346 A1 | 10/2020 | Maroney et al. | |
| 2020/0369468 A1* | 11/2020 | Searle | H04N 7/183 |
| 2020/0401807 A1* | 12/2020 | Wildgrube | B65F 3/048 |
| 2022/0234505 A1 | 7/2022 | Smith | |

\* cited by examiner

VIDEO DISPLAY FOR REFUSE COLLECTION

CROSS-REFERENCE TO RELATED APPLICATIONS

This application is a continuation of U.S. patent application Ser. No. 17/578,914, entitled "Video Display for Refuse Collection," filed Jan. 19, 2022, which claims the benefit under 35 U.S.C. § 119(e) of U.S. Patent Application No. 63/142,380, entitled "Video Display for Refuse Collection," filed Jan. 27, 2021, which are incorporated herein by reference in their entirety.

TECHNICAL FIELD

This disclosure relates to methods of operating a refuse collection vehicle and monitoring refuse collection performed by the refuse collection vehicle.

BACKGROUND

Refuse collection vehicles have been used for generations for the collection and transfer of waste. The safe and productive operation of a refuse collection vehicle requires that the operator of the vehicle perform many tasks while simultaneously monitoring the vehicle and surroundings. Many refuse collection vehicles have mechanisms, such as grabber arms, that are operated to collect refuse from refuse containers to the side of vehicle, rather than the front of the vehicle. As a result, during refuse collection, operators of these types of vehicles may be required to temporarily divert their attention from the front of the vehicle and path of travel in order to monitor the collection of refuse by the vehicle.

SUMMARY

In an example implementation, a refuse collection vehicle includes a grabber that is operable to engage a refuse container, a lift arm coupled to the grabber and operable to raise and lower the grabber, a camera that is arranged to generate video data of a scene external to the refuse collection vehicle, and a semi-transparent display device configured to display the video data generated by the camera, wherein the semi-transparent display is positioned within a forward line of sight of an operator of the refuse collection vehicle In an aspect combinable with the example implementation, the semi-transparent display device includes a semi-transparent film attached to a windshield of the refuse collection vehicle.

In another aspect combinable with any of the previous aspects, the semi-transparent film is attached to the windshield of the refuse collection vehicle in line with a steering wheel of the refuse collection vehicle.

In another aspect combinable with any of the previous aspects, the semi-transparent film includes beamsplitter glass.

In another aspect combinable with any of the previous aspects, the refuse collection vehicle includes a monitor arranged to project the video data generated by the camera onto the semi-transparent film, and the semi-transparent film reflects the video data projected by the monitor.

In another aspect combinable with any of the previous aspects, the semi-transparent display device has a transparency in a range of 50% transparent to 70% transparent.

In another aspect combinable with any of the previous aspects, the semi-transparent display device comprises an electronic glasses device worn by an operator of the refuse collection vehicle.

In another aspect combinable with any of the previous aspects, the video data generated by the camera is displayed on the semi-transparent display device in real time.

In another aspect combinable with any of the previous aspects, the video data is generated while the refuse collection vehicle is performing a dump cycle.

In another aspect combinable with any of the previous aspects, the camera is a first camera configured to generate video data of a side of the refuse collection vehicle, and the refuse collection vehicle includes a second camera configured to generate video data of a hopper of the refuse collection vehicle and a sensor configured to detect a lift angle of the lift arm of the refuse collection vehicle.

In another aspect combinable with any of the previous aspects, when the sensor detects that the lift arm of the refuse collection vehicle is below a threshold angle, a first stream of video data generated by the first camera is displayed on the semi-transparent display device, and when the sensor detects that the lift arm of the refuse collection vehicle is above the threshold angle, a second stream of video data generated by the second camera is displayed on the semi-transparent display device In another example implementation, a method of operating a refuse collection vehicle to collect refuse from a refuse container includes receiving video data from a camera coupled to the refuse collection vehicle and arranged to generate video data of a scene external to the refuse collection vehicle, and controlling a graphical display system of the refuse collection vehicle to display the video data received from the camera onto a semi-transparent display device of the graphical display system positioned within a forward line of sight of an operator of the vehicle.

In an aspect combinable with the example implementation, the semi-transparent display device comprises a semi-transparent film attached to a windshield of the refuse collection vehicle.

In another aspect combinable with any of the previous aspects, the semi-transparent film is attached to the windshield of the refuse collection vehicle in line with a steering wheel of the refuse collection vehicle.

In another aspect combinable with any of the previous aspects, controlling the graphical display system of the refuse collection vehicle to display the video data received from the camera onto the semi-transparent display device of the graphical display system includes controlling a monitor device to display the video data generated by the camera onto the semi-transparent film, and the semi-transparent film reflects the video data displayed by the monitor.

In another aspect combinable with any of the previous aspects, the video data generated by the camera is displayed on the semi-transparent display device in real time.

In another aspect combinable with any of the previous aspects, the video data is received from the camera and displayed on the semi-transparent display device in response to receiving one or more signals indicating that the refuse collection vehicle is initiating a dump cycle.

In another aspect combinable with any of the previous aspects, the video data is received from the camera and displayed on the semi-transparent display device in response to receiving one or more signals indicating that the refuse collection vehicle is proximate the refuse container.

In another aspect combinable with any of the previous aspects, the camera is a first camera configured to generate video data of a side of the refuse collection vehicle, and the video data is a first video stream generated by the first camera depicting a grabber of the refuse collection vehicle engaging the refuse container.

In another aspect combinable with any of the previous aspects, the method includes receiving a signal from a sensor indicating that an angle of a lift arm of the refuse collection vehicle is above a threshold angle, and in response to receiving the signal, causing the semi-transparent display device to display a second video stream generated by a second camera arranged to generate video data of a hopper of the refuse collection vehicle.

In another aspect combinable with any of the previous aspects, the second video stream depicts contents of the refuse container being dumped into the hopper of the refuse collection vehicle.

In another aspect combinable with any of the previous aspects, the signal is a first signal, and the method includes receiving a second signal from the sensor, the second signal indicating that the angle of the lift arm of the refuse collection vehicle is below the threshold angle, and in response to receiving the second signal, causing the semi-transparent display device to display a third video stream generated by the first camera.

In another aspect combinable with any of the previous aspects, the third video stream depicts the refuse container being lowered by the lift arm and released by the grabber.

In another aspect combinable with any of the previous aspects, the method includes receiving a signal from a sensor indicating that a grabber of the refuse collection vehicle has released the refuse container, and in response to receiving the signal, causing the semi-transparent display device to stop displaying the video data.

Other implementations include corresponding systems, apparatus, and computer programs, configured to perform the actions of the methods, encoded on computer storage device.

Potential benefits of the one or more implementations described in the present specification may include improved safety by enabling the operator on a refuse collection vehicle to simultaneously monitor refuse collection being performed by the vehicle while maintaining his or her gaze forward to the front of the vehicle (e.g., towards the path of travel). The one or more implementations may also increase waste collection efficiency and reduce operator error. The one or more implementations may also reduce the likelihood of damaging refuse collection vehicles or surrounding objects during refuse collection. The one or more implementations may reduce neck fatigue of an operator by projecting video data of areas of interest within the operator's forward facing line of sight. In addition, the one or more implementations may reduce reaction time of an operator by shifting the operator's line of sight from a remote monitor to the forward view and allowing the operator to simultaneously monitor video data and the surroundings to the front of the vehicle.

The details of one or more embodiments are set forth in the accompanying drawings and the description below. Other features, objects, and advantages of the disclosure will be apparent from the description and drawings, and from the claims.

DETAILED DESCRIPTION

Figure 1:
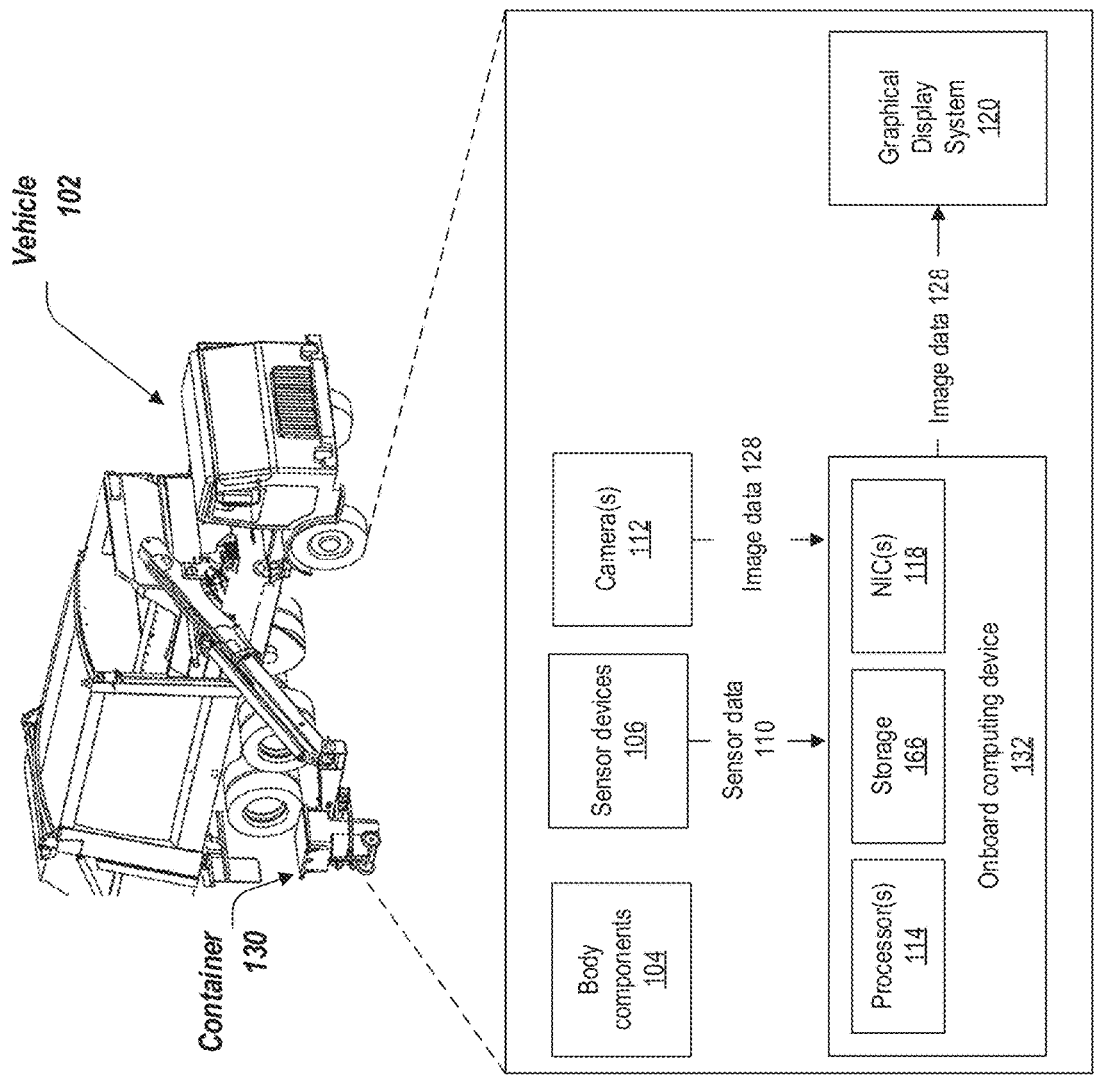
FIG. 1 depicts an example system for collecting refuse.

FIG. 1 depicts an example system for collecting refuse. Vehicle 102 is a refuse collection vehicle that operates to collect and transport refuse (e.g., garbage and/or recycling). The refuse collection vehicle 102 can also be described as a garbage collection vehicle, or garbage truck. The vehicle 102 is configured to lift containers 130 that contain refuse, empty the refuse in the containers into a hopper of the vehicle 102, to enable transport of the refuse to a collection site, compacting of the refuse, and/or other refuse handling activities.

The body components 104 of the vehicle 102 can include various components that are appropriate for the particular type of vehicle 102. For example, a garbage collection vehicle may be a truck with an automated side loader (ASL). Alternatively, the vehicle may be a front-loading truck, a rear loading truck, a roll off truck, or some other type of garbage collection vehicle. A vehicle with an ASL, such as the example shown in FIGS. 2A-2C, may include body components 104 involved in the operation of the ASL, such as an arm and/or grabbers, as well as other body components such as a pump, a tailgate, a packer, and so forth. A front-loading vehicle may include body components such as a pump, tailgate, packer, grabber, and so forth. A rear loading vehicle may include body components such as a pump, blade, tipper, and so forth. A roll off vehicle may include body components such as a pump, hoist, cable, and so forth. Body components 104 may also include other types of components that operate to bring garbage into a hopper (or other storage area) of a truck, compress and/or arrange the garbage in the vehicle, and/or expel the garbage from the vehicle.

The vehicle 102 can include any number of body sensor devices 106 that sense body component(s) 104 and generate sensor data 110 describing the operation(s) and/or the operational state of various body components 104. The body sensor devices 106 are also referred to as sensor devices, or sensors. Sensors may be arranged in the body components, or in proximity to the body components, to monitor the operations of the body components. The sensors 106 emit signals that include the sensor data 110 describing the body component operations, and the signals may vary appropriately based on the particular body component being monitored. Sensors may also be arranged to provide sensor data 110 describing the position of external objects, such as a refuse container.

In some implementations, one or more sensors 106 can be provided on the vehicle body to evaluate cycles and/or other parameters of various body components. For example, one or more sensors 106 can measure the hydraulic pressure of various hydraulic components, and/or pneumatic pressure of pneumatic components. As described in further detail herein, the sensors 106 can detect and measure the particular position or operational state of body components, such as the position of a grabber of the vehicle 102 and the position of a lift arm of the vehicle 102.

In some implementations, the sensor data 110 is analyzed, by a computing device on the vehicle and/or by remote computing device(s), to identify the presence of a triggering condition based at least partly on the operational state of one or more body components 104, as described in further detail below. Sensors 106 can include, but are not limited to, an analog sensor, a digital sensor, a CAN bus sensor, a magnetostrictive sensor, a radio detection and ranging (RADAR) sensor, a light detection and ranging (LIDAR) sensor, laser sensor, an ultrasonic sensor, an infrared (IR) sensor, a stereo camera sensor, a three-dimensional (3D) camera, an in-cylinder sensor, or a combination thereof.

In some implementations, the sensor data may be communicated from the sensors to an onboard computing device 132 in the vehicle 102. In some instances, the onboard computing device is an under-dash device (UDU), and may also be referred to as the Gateway. Alternatively, the computing device 132 may be placed in some other suitable location in or on the vehicle. The sensor data 110 may be communicated from the sensors to the onboard computing device 132 over a wired connection (e.g., an internal bus) and/or over a wireless connection. In some implementations, a bus compliant with International Organization of Standardization (ISO) standard 11898 connects the various sensors with the onboard computing device 132. In some implementations, a Controller Area Network (CAN) bus connects the various sensors with the onboard computing device 132. For example, a CAN bus compliant with ISO standard 11898 can connect the various sensors with the onboard computing device 132. In some implementations, the sensors may be incorporated into the various body components. Alternatively, the sensors may be separate from the body components. In some implementations, the sensors digitize the signals that communicate the sensor data before sending the signals to the onboard computing device 132, if the signals are not already in a digital format.

The analysis of the sensor data 110 can be performed at least partly by the onboard computing device 132, e.g., by processes that execute on the processor(s) 114. For example, the onboard computing device 132 may execute processes that perform an analysis of the sensor data 110 to determine the current position of the body components, such as the grabber position or lift arm position. In some implementations, an onboard program logic controller or an onboard mobile controller perform analysis of the sensor data 110 to determine the current position of the body components 104.

The onboard computing device 132 can include one or more processors 114 that provide computing capacity, data storage 166 of any suitable size and format, and network interface controller(s) 118 that facilitate communication of the device 132 with other device(s) over one or more wired or wireless networks.

In some implementations, a vehicle includes a body controller that manages and/or monitors various body components of the vehicle. The body controller of a vehicle can be connected to multiple sensors in the body of the vehicle. The body controller can transmit one or more signals over a CAN network or a J1939 network, or other wiring on the vehicle, when the body controller senses a state change from any of the sensors. These signals from the body controller can be received by the onboard computing device 132 that is monitoring the CAN network or the J1939 network.

In some implementations, the onboard computing device 132 is a multi-purpose hardware platform. The device can include a UDU (gateway) and/or a window unit (WU) (e.g., a device with cameras, speakers, and/o microphones) to record video and/or audio operational activities of the vehicle. The onboard computing device 132 hardware sub-components can include, but are not limited to, one or more of the following: a CPU, a memory or data storage unit, a CAN interface, a CAN chipset, NIC(s) such as an Ethernet port, USB port, serial port, I2c lines(s), and so forth, I/O ports, a wireless chipset, a global positioning system (GPS) chipset, a real-time clock, a micro SD card, an audio-video encoder and decoder chipset, and/or external wiring for CAN and for I/O. The device can also include temperature sensors, battery and ignition voltage sensors, motion sensors, CAN bus sensors, an accelerometer, a gyroscope, an altimeter, a GPS chipset with or without dead reckoning, and/or a digital can interface (DCI). The DCI cam hardware subcomponent can include the following: CPU, memory, can interface, can chipset, Ethernet port, USB port, serial port, I2c lines, I/O ports, a wireless chipset, a GPS chipset, a real-time clock, and external wiring for CAN and/or for I/O. In some implementations, the onboard computing device 132 is a smartphone, tablet computer, and/or other portable computing device that includes components for recording video and/or audio data, processing capacity, transceiver(s) for network communications, and/or sensors for collecting environmental data, telematics data, and so forth.

In some implementations, one or more cameras 112 can be mounted on the vehicle 102 or otherwise present on or in the vehicle 102. The camera(s) 112 can each generate image data 128 that includes one or more images or video of a scene external to and in proximity to the vehicle 102 and/or images or video of an interior of the vehicle 102. In some implementations, one or more cameras 112 are arranged to capture image(s) and/or video of a container 130 before, after, and/or during the operations of body components 104 to engage and empty a container 130. For example, the camera(s) 112 can be arranged to image objects dumped into the hopper of the vehicle. As another example, for a side loading vehicle, the camera(s) 112 can be arranged to image objects to the side of the vehicle, such as a side that mounts the ASL to lift containers. In some implementations, camera(s) 112 can capture video of a scene external to and in proximity to the vehicle 102.

Figure 2A:
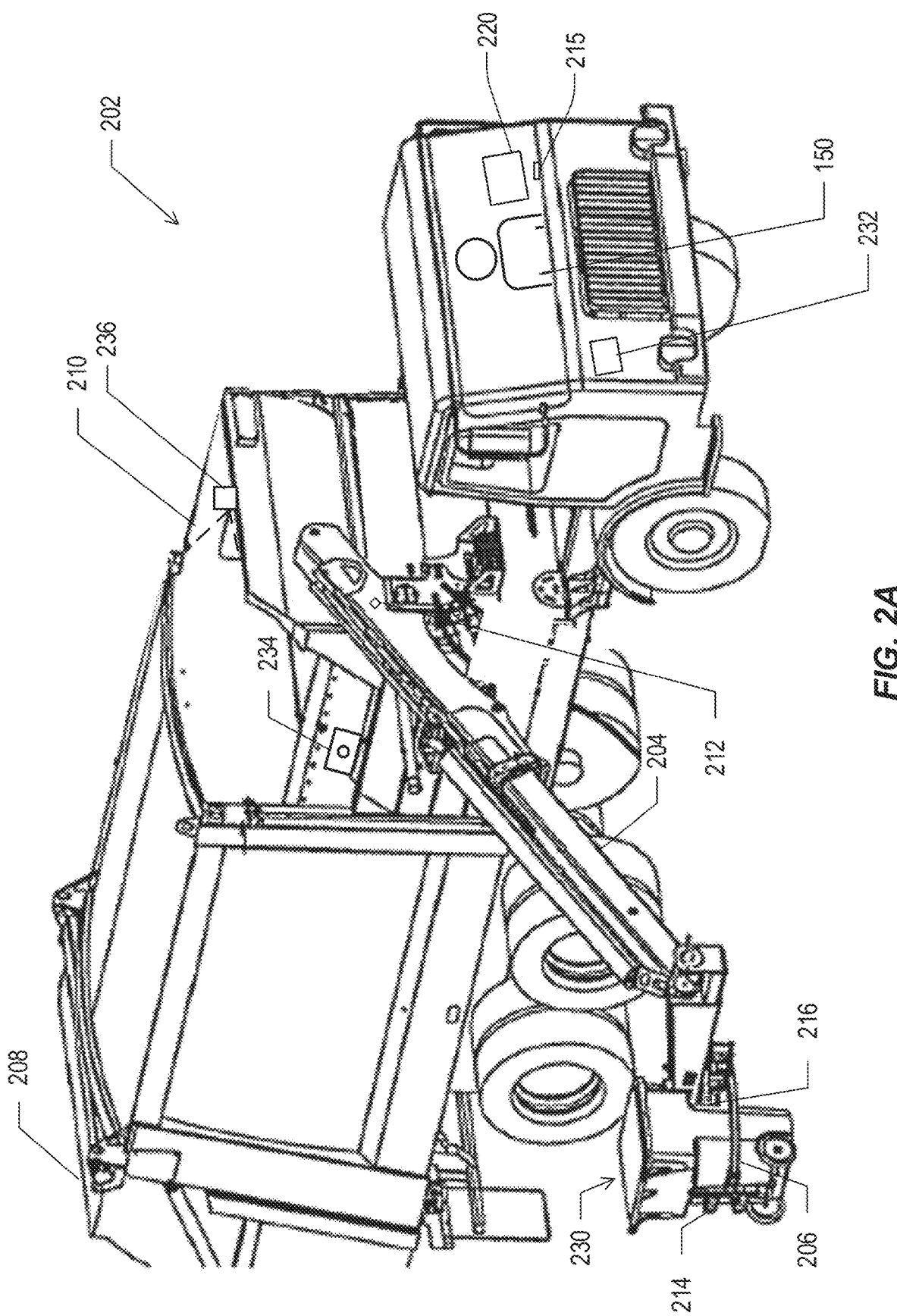
FIGS. 2A-2C depict an exemplary side-loader refuse collection vehicle performing a dump cycle.
Figure 2B:
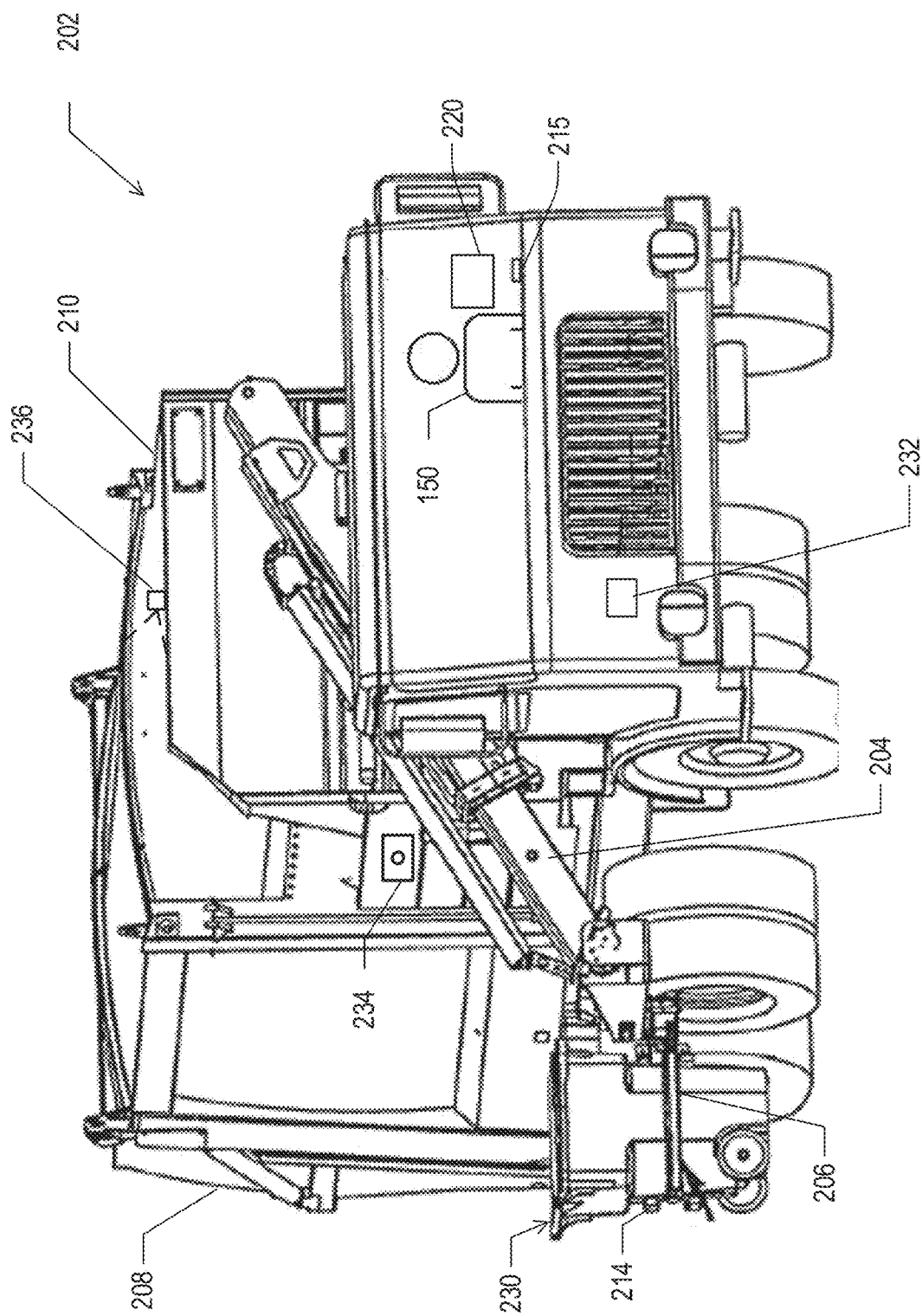
Figure 2C:
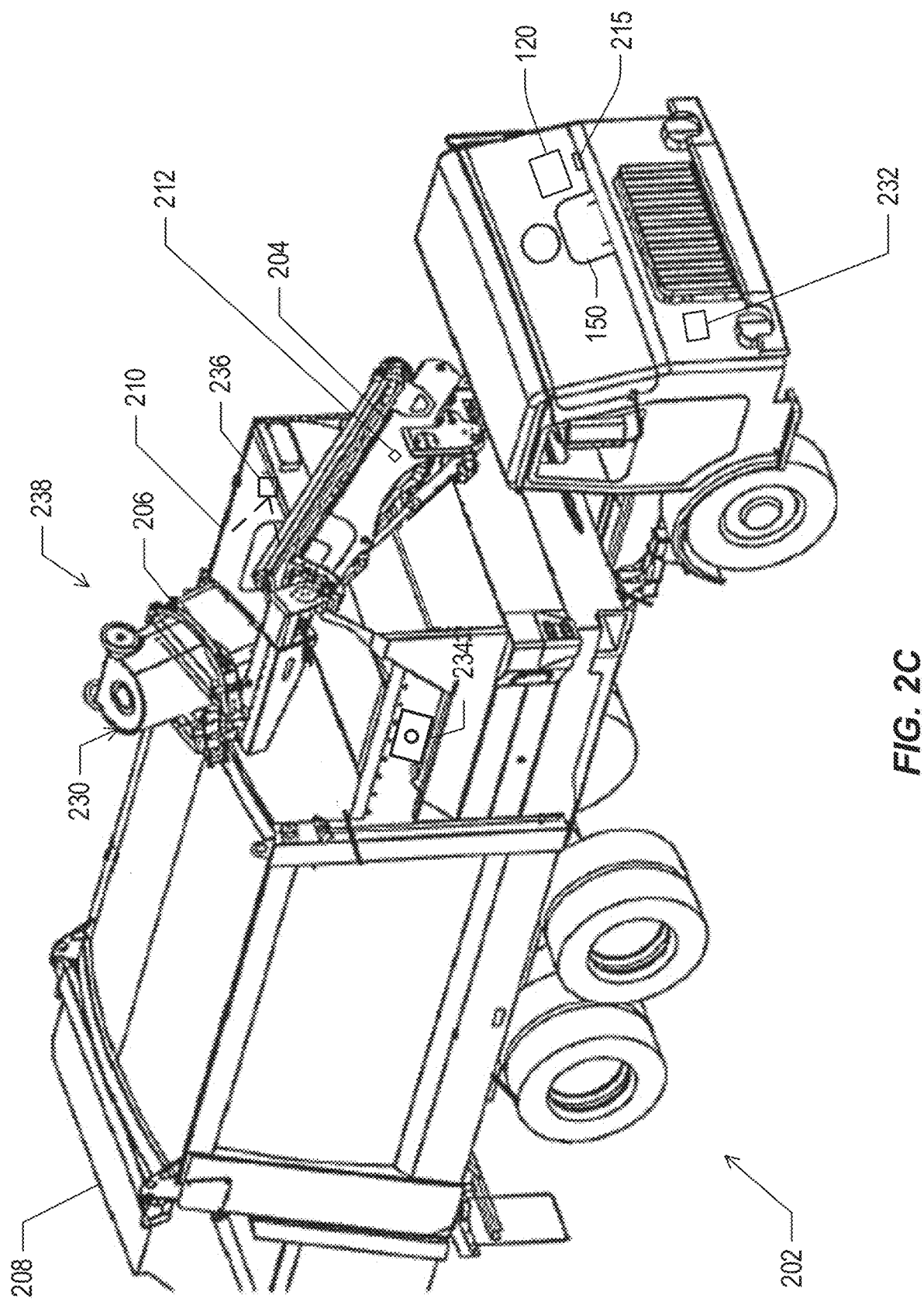

In some implementations, the camera(s) 112 are communicably coupled to a graphical display system 120 to communicate images and/or video captured by the camera(s) 112 to the graphical display system 120. In some implementations, the graphical display system 120 is placed within the interior of the vehicle. For example, as depicted in FIGS. 2A-2C, the graphical display system 120 can be placed within the cab of vehicle 102 such that the images and/or video can be viewed by an operator of the vehicle using the graphical display system 120. As will be described in further detail herein, in some implementations, the graphical display system 120 includes a heads-up display that projects images and/or video within a forward-facing line of sight of the operator of the vehicle. As a result, the operator of the vehicle 102 can view the images and/or video displayed by the heads up graphical display system without having to turn or shift his or her focus from the front of the vehicle 102.

In some implementations, the images and/or video captured by the camera(s) 112 can be communicated to a graphical display system 120 using the onboard computing device 132 in the vehicle 102. For example, images and/or video captured by the camera(s) 112 can be communicated from the camera(s) 112 to the onboard computing device 132 over a wired connection (e.g., an internal bus) and/or over a wireless connection, and the onboard computing device 132 controls the images or video that are displayed by the graphical display system 120. In some implementations, a J1939 bus or CAN bus connects the camera(s) with the onboard computing device 132.

In some implementations, the camera(s) are incorporated into the various body components. Alternatively, the camera(s) may be separate from the body components.

FIGS. 2A-2C depict an exemplary side-loader refuse collection vehicle performing a dump cycle. The side-loader refuse collection vehicle 202 includes various body components including, but not limited to: a lift arm 204, a grabber mechanism 206, a back gate or tailgate 208, and a hopper 210 to collect refuse during operation.

One or more sensors 212, 214, 216 (e.g., similar to sensor devices 106 of FIG. 1) are situated on the vehicle 202 to determine the state and/or detect the operations of the body components 204, 206, 208, 210. In the example shown, the lift arm 204 includes an arm position sensor 212 that is arranged to detect the position of the lift arm 204, such as it position throughout a dump cycle of lifting a refuse container 230 and emptying its contents into the hopper 210. The sensor data provided by arm position sensor 212 can be analyzed to monitor a dump cycle being conducted by the refuse collection vehicle 202. For example, the arm position sensor 212 can provide data about the current position of the lift arm 204, which, as described in further detail herein, can be used to determine the current step being conducted in a dump cycle being performed by the vehicle 202.

In the example shown, container detection sensors 214, 216 are arranged on the vehicle 202 to detect the presence and position of a refuse container 230. For example, container detection sensors 214, 216 detect whether a can is fully engaged by the grabber mechanism 206. Multiple container detection sensors 214, 216 can be implemented to provide redundancy in refuse container detection.

Sensors 212, 214, 216 can include, but are not limited to, a mechanical plunger, a contact sensor, an analog sensor, a digital sensor, a CAN bus sensor, a RADAR sensor, a LIDAR sensor, an ultrasonic sensor, a camera, or a combination thereof. In some implementations, the arm position sensor 212 includes one or more of an in-cylinder stroke transducer, an external linear variable differential transformer (lvdt), a proximity switch, a limit switch, a magnetostrictive device, or a combination thereof. In some implementations, the container detection sensors 214, 216 include one or more of a RADAR sensor, a LIDAR sensor, a laser sensor, a sonar sensor, an image recognition device, or a combination thereof.

The vehicle 202 also includes one or more cameras 234, 236. In the example shown in FIGS. 2A-2C, a first camera 234 is positioned to visualize the environment proximate a side of the vehicle 202, including a refuse container 230 to be engaged by the vehicle 202. For example, the side view camera 234 can be aligned with a centerline of the grabber mechanism 206. The side view camera 234 helps provide the vehicle operator 150 with a clear visual line of sight of a refuse container 230 located to the side of the vehicle 202. This can be particularly useful when the refuse container to be engaged is within close proximity of the vehicle 202.

In some implementations, the side view camera 234 is contained within an enclosure. For example, the camera 234 can be contained within a metal enclosure that also includes a light source. Placing the side view camera 234 in an enclosure can help protect the camera 234 from debris.

In the example shown, a second camera 236 is positioned at the top of the vehicle 202 in order to visualize refuse contained in the vehicle 202 or falling into the vehicle 202, such as refuse in the hopper of the vehicle 202. The angle of each of the cameras 234, 236 can be adjusted by the vehicle operator 150.

The camera(s) 234, 236 may also be placed in other positions and/or orientations. For example, the vehicle 202 can include one or more cameras placed within the cab of the vehicle 202 to capture images or video of the inside of the cab of the vehicle 202 and/or of the exterior of the vehicle 202 through a windshield of the vehicle 202.

Images and/or video captured by camera(s) 234, 236 are provided to a graphical display system 220 and are displayed to the operator 150 using the graphical display system 220. As shown in FIGS. 2A-2C, the graphical display system 220 is placed within the cab of vehicle 202 such that the images and/or video can be viewed by the operator 150 of the vehicle 202 using the graphical display system 220. In some implementations, the graphical display system 220 includes a screen and images and/or video can be viewed by an operator 150 of the vehicle 202 on the screen.

In some implementations, the graphical display system 220 is a heads-up display system. For example, referring to FIGS. 3 and 4, the graphical display system 220 can include a monitor 304 configured to display images and/or video and a semi-transparent film 302 attached to the inside of the windshield 238 of the vehicle 202 and configured to reflect the images and/or video displayed by the monitor 304.

Figure 3:
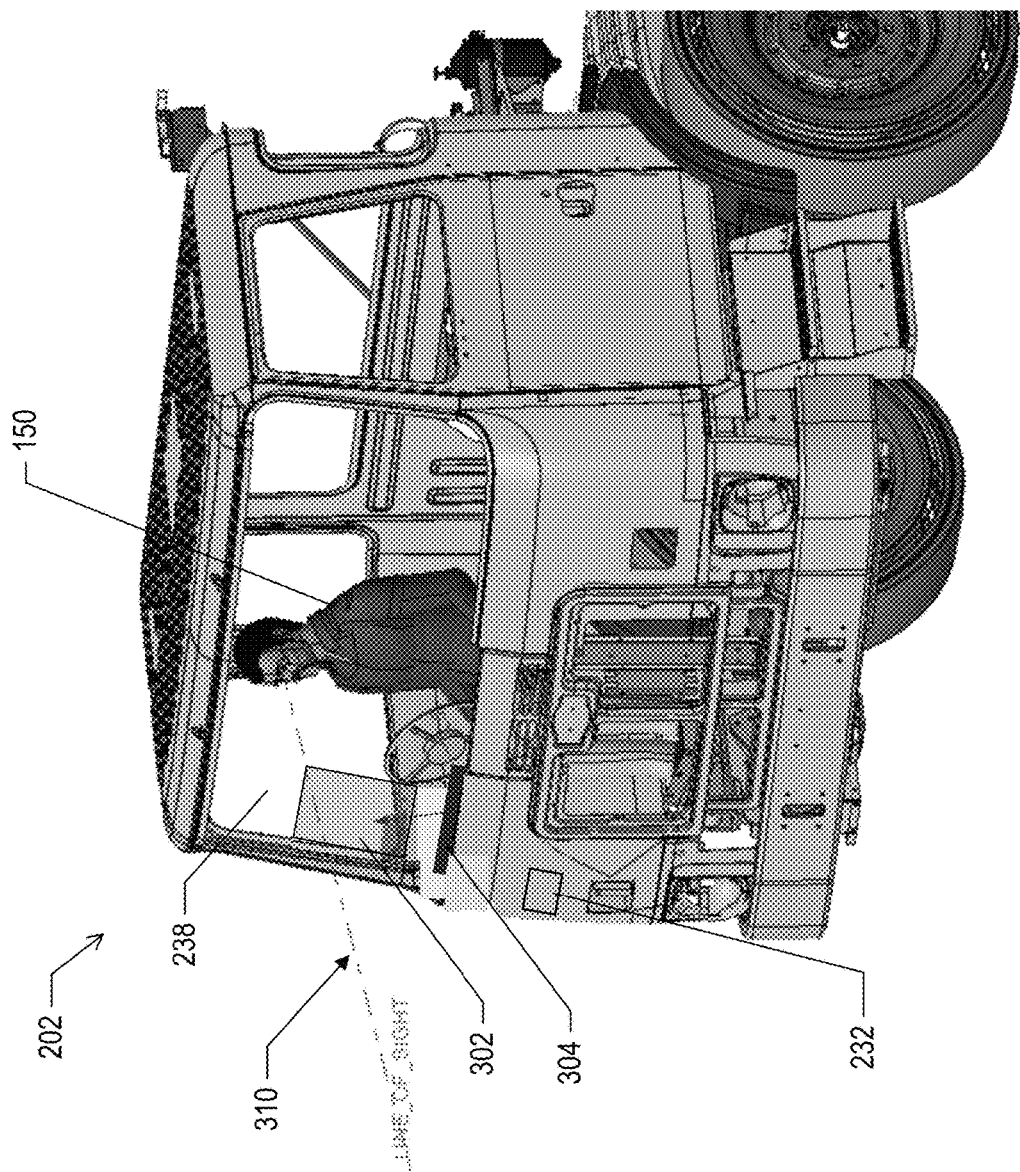
FIG. 3 depicts a front perspective view of the side-loader refuse collection vehicle of FIGS. 2A-2C with a graphical display system.
Figure 4:
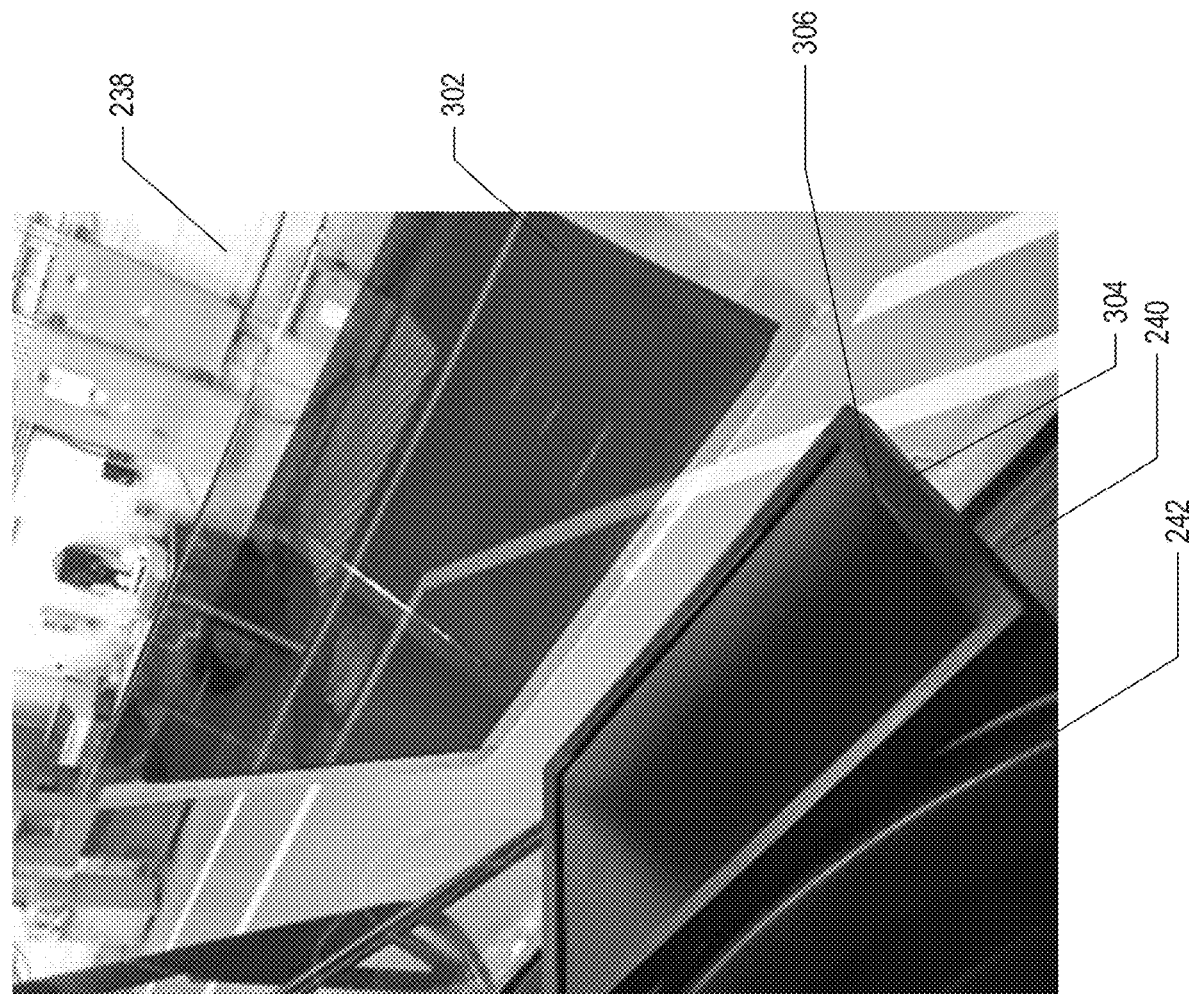
FIG. 4 depicts the graphical display system of FIG. 3.
Figure 6:
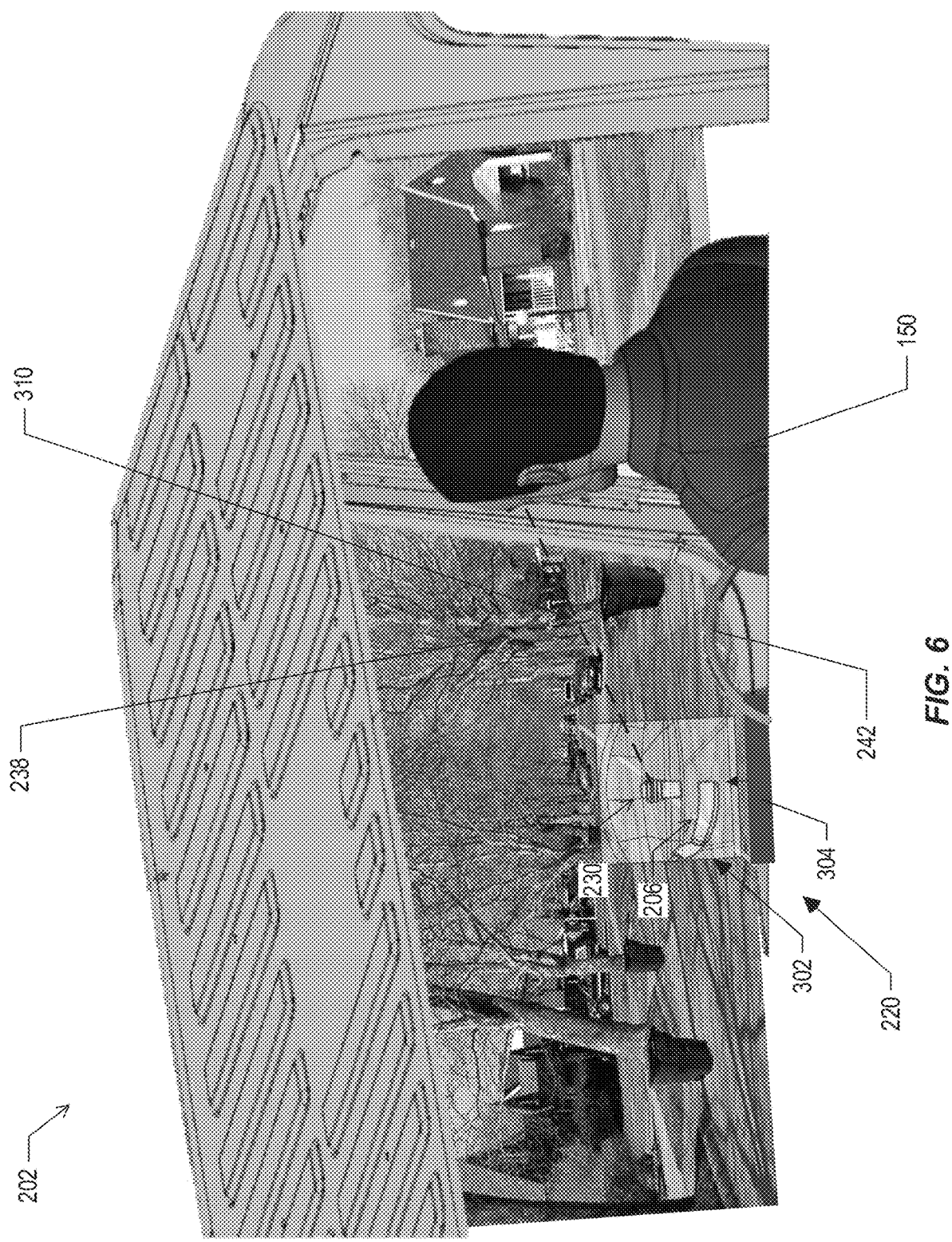
FIGS. 6 and 7 depict example displays of video data using the graphical display system of FIGS. 3 and 4.
Figure 7:
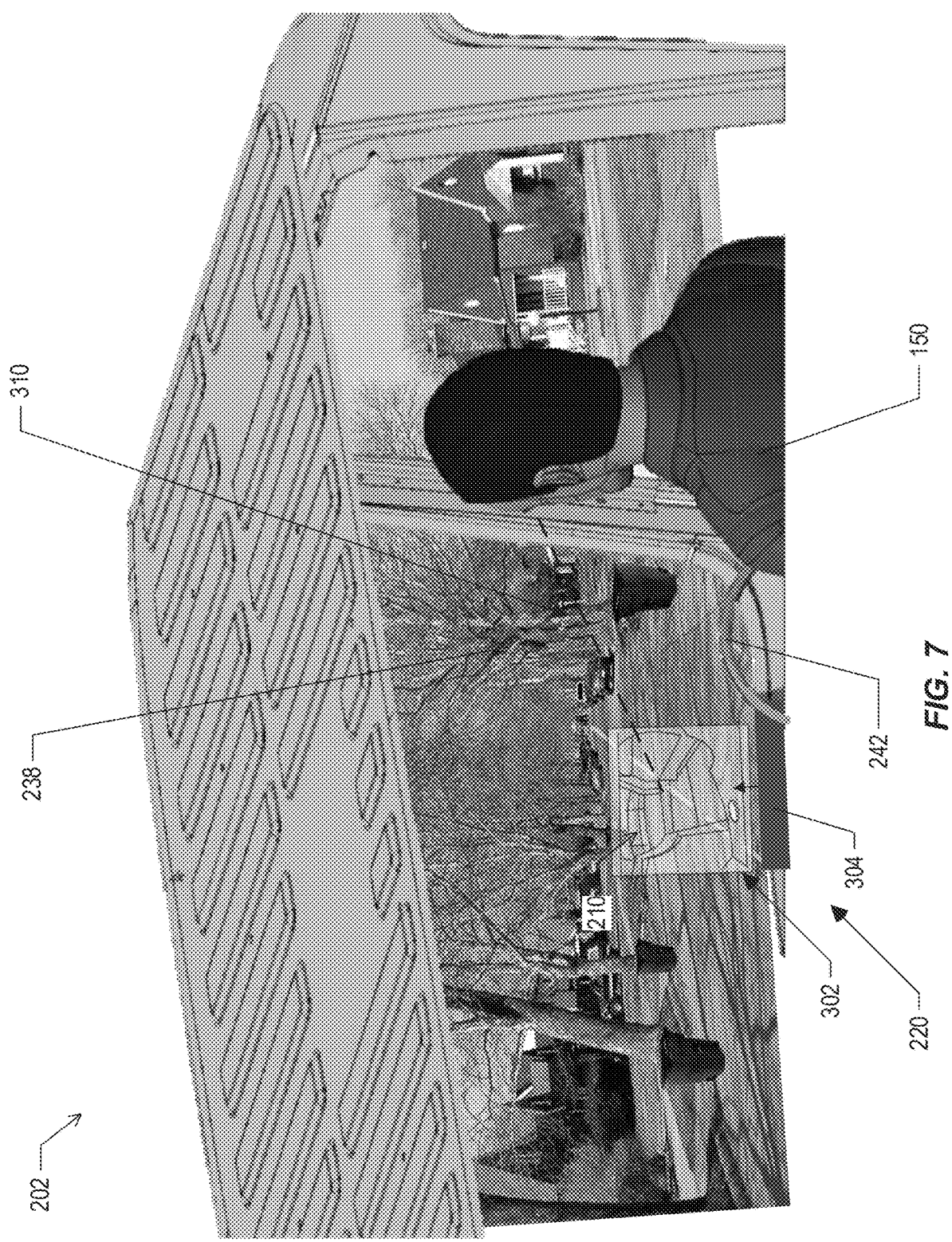

The monitor 304 has a screen 306 that is capable of displaying images or video, such as image or video data received generated by the onboard cameras 234, 236. As can be seen in FIG. 4, the monitor 304 is attached to the dashboard 240 of the vehicle 202 behind the steering wheel 242 of the vehicle 202 and is aligned with the semi-transparent film 302. As depicted in FIG. 3, the semi-transparent film 302 is positioned on the windshield 238 such that the semi-transparent film 302 is within the operator's line of sight 310 when the operator 150 is looking forward out the windshield 238 (e.g., when looking at the road or objects in front of the vehicle 202). For example, as depicted in FIGS. 3, 6 and 7, the semi-transparent film 302 can be attached to the inside of the windshield 238 of the vehicle 202 in line with the steering wheel 242 of the vehicle 202 such that the semi-transparent film 302 is positioned in the operator's forward-facing line of sight 310 when the operator 150 is driving the vehicle 202. The semi-transparent film 302 can be attached to the windshield 328 using one or more fastening mechanisms. Fastening mechanisms for attaching the semi-transparent film 302 to the windshield 328 can include, but are not limited to, adhesive strips, double-sided adhesive tape, liquid adhesive, suction mechanisms (e.g., suction brackets), or a combination thereof.

The monitor 304 and semi-transparent film 302 are positioned relative to one another such that images and/or video displayed on the screen 306 of the monitor 304 are projected onto and reflected by the semi-transparent film 302. The semi-transparent film 302 is attached to the windshield 238 at a position that is within an operator's line of sight 310 when driving the vehicle 202 or viewing the environment in front of the vehicle 202 through the windshield 238. As a result, any images or video displayed by the monitor 304 are reflected by the semi-transparent film 302 within the operator's line of sight 310, making it easy for the operator 150 to view the images or video while maintaining his gaze on the environment in front of the vehicle 202 (e.g., the road) through the windshield 238. As can be seen in FIGS. 3 and 4, the monitor 304 is not within the line of sight 310 of the operator 150. As such, the operator 150 does not view the images and/or video displayed on the screen 306 of the monitor 304 directly, but rather views the reflection of the images and/or video reflected within the operator's line of sight 310 generated by the semi-transparent film 302 on the windshield 238.

In some implementations, the monitor 304 has reverse image capability and is configured to display a reverse of the images and/or video captured by camera(s) 234, 236 and provided to a graphical display system 220. Since the semi-transparent film 302 reflects the images or video displayed by the monitor 304, using a monitor 304 that displays a reverse of the images or video enables the reflection provided by the semi-transparent film 302 in the operator's forward-facing line of sight 310 to be a non-reversed representation of the images or video captured by the camera(s) 234, 236. In addition, in some implementations, the monitor 304 has a substantially flat screen 306, which enables the monitor 304 to be concealed from the operator's line of sight 310 when the monitor 304 is positioned on the dashboard 240 of the vehicle 202 behind the steering wheel 242. In some implementations, the monitor 304 includes an RCA type input.

The semi-transparent film 302 has a level of transparency that enables the operator 150 to view the images and/or video reflected by the semi-transparent film 302 while still being able to view the environment external to the vehicle 202 (e.g., the objects and/or road in front of the vehicle 202) through the semi-transparent film 302. In some implementations, the semi-transparent film 302 has a transparency ranging from about 50% transparent to about 70% transparent. In some implementations, the semi-transparent film 302 has a transparency ranging from about 50% transparent to about 60% transparent. The semi-transparent film 302 can be composed of any suitable semi-transparent, reflective material, such as beamsplitter glass or semi-transparent, reflective acrylic. In some implementations, the semi-transparent film is 50/50 beamsplitter glass. In some implementations, the semi-transparent film is 60/40 beamsplitter glass. In some implementations, the semi-transparent film is a semi-transparent organic light-emitting diode (OLED) screen.

In some implementations, a film of tint is positioned on the windshield 238 behind the semi-transparent film 302. For example, a film of tint can be positioned between the semi-transparent film 302 and the windshield 238. Positioning a film of tint on the windshield 238 behind the semi-transparent film 302 can improve the visibility of the images or video reflected by the semi-transparent film 302 during the daytime by shading some of the ambient light passing through the semi-transparent film 302.

As can be seen in FIGS. 3 and 4, the semi-transparent film 302 has a rectangular shape. However, any suitable shape of semi-transparent film 302 can be used, such as square, circular, or oval shapes. In addition, any suitable size of semi-transparent film 302 can be used. In some implementations, the semi-transparent film has an area ranging from about 49 square inches to about 100 square inches.

In some implementations, the images and/or video captured by the camera(s) 234, 236 can be communicated to a graphical display system 220 via an onboard computing device 232 of the vehicle 202 (e.g., similar to onboard computing device 132 of FIG. 1). Images and/or video captured by the camera(s) 234, 236 can be communicated from the computing device in the vehicle 202 to the graphical display system 220, over a wired connection (e.g., an internal bus) and/or over a wireless connection. In addition, the images and/or video captured by the camera(s) 234, 236 can be communicated from the camera(s) 234, 236 to the onboard computing device 232 of the vehicle 202 over a wired connection (e.g., an internal bus) and/or over a wireless connection. In some implementations, a J1939 bus connects the camera(s) 234, 236 with the onboard computing device 232. In some implementations, the camera(s) 234, 236 are communicably coupled to the graphical display system 220 (e.g., over a wired connection (e.g., an internal bus) or over a wireless connection), and image and/or video captured by the camera(s) 234, 236 can be communicated from the camera(s) 234, 236 directly to the graphical display system 220.

In some implementations, the image or video data that is to be displayed by the graphical display system 220 is determined based on the detection of one or more events, such as the vehicle 202 conducting a dump cycle, the vehicle 202 being switched into a reverse gear, the vehicle 202 changing lanes, or the occurrence of certain diagnostic fault codes. For example, in some implementations, the images and/or video are provided to the graphical display system 220 at least in part based on data received from one or more body sensors 212, 214, 216. For example, the onboard computing device 232 may execute processes that perform an analysis of the data received from the body sensors 212, 214, 216 to detect the presence of a triggering condition, such as initiation of a dump cycle, the lift arm 204 being in a particular position in its dump cycle. Upon detecting the triggering condition, the computing device can send a signal to one or more cameras 234, 236 to provide images and/or video captured by the camera to the graphical display system 220 via the onboard computing device 232.

For example, as discussed above, container detection sensors 214, 216 are arranged on the vehicle 202 to detect the presence and position of a refuse container 230 relative to the vehicle 202. Whenever one or more of the container detection sensors 214, 216 detect the presence of a refuse container 230 proximate the vehicle 202, an onboard computing device 232 of the vehicle 202 can send a signal to camera 234 located on the side of the body of vehicle 202 to provide, in real-time, images and/or video of the surroundings to the side of the vehicle captured by the camera 234 to the graphical display system 220. In some implementations, the vehicle 202 includes a controller 215 inside the cab of the vehicle 202 that can be used by the operator 150 to initiate a dump cycle. In response to the operator 150 initiating a dump cycle using the controller 215, an onboard computing device 232 of the vehicle 202 can send a signal to the camera 234 located on the side of the body of vehicle 202 to provide, in real-time to the graphical display system 220, images and/or video of the surroundings to the side of the vehicle captured by the camera 234, including images and/or video of the refuse container 230 to be serviced and the grabber 206.

In addition, images and/or video displayed by the graphical display system 220 can be controlled based on the position of the lift arm 204 of the vehicle 202. For example, sensor 212 can monitor the angle of lift arm 204 during a dump cycle, and can provide this data to an onboard computing device 232 of the vehicle 202. For example, whenever sensor 212 detects that the angle of lift arm 204 relative to the surface on which the vehicle 202 is positioned (e.g., the road surface) is below a threshold angle, an onboard computing device 232 of the vehicle 202 sends a signal to camera 234 located on the side of the body of vehicle 202 to provide to the graphical display system 220, in real-time, images and/or video of the surroundings to the side of the vehicle 202 captured by the camera 234, including images and/or video of the refuse container 230 being serviced and the grabber 206. FIG. 6 depicts an exemplary video stream of a refuse container 230 captured by camera 234 located on the side of vehicle 202 and presented on the monitor 304 As can be seen in FIG. 6, the video displayed by the monitor 304 is reflected into the operator's line of sight 310 by the semi-transparent film 302.

In some implementations, whenever sensor 212 detects that the angle of lift arm 204 relative to the surface on which the vehicle 202 is positioned is above a threshold angle, an onboard computing device 232 of the vehicle 202 sends a signal to camera 236 located on the top of the vehicle 202 to provide to the graphical display system 220, in real-time, images and/or video captured by the camera 236, including images and/or video of refuse being dumped from the refuse container 230 into the hopper 210. FIG. 7 depicts an exemplary video stream of the inside of a hopper 210 of a side-loader vehicle 202 captured by camera 236 located on the top of vehicle 202 and presented on the monitor 304. As can be seen in FIG. 7, the video of the hopper 210 displayed by the monitor 304 is reflected into the operator's line of sight 310 by the semi-transparent film 302.

In some implementations, whenever the lift arm 204 is raised above the threshold angle, the images and/or video being provided to the graphical display system 220 are automatically switched from image(s)/video provided by the side view camera 234 to image(s)/video provided by the top view camera 236 (i.e. switched from the view depicted in FIG. 6 to the view depicted in FIG. 7). Similarly, in some implementations, whenever the lift arm 204 is lowered below the threshold angle, the images and/or video being provided to the graphical display system 220 are automatically switched from image(s)/video provided by the top view camera 236 to image(s)/video provided by the side view camera 234 (i.e. switched from the view depicted in FIG. 7 to the view depicted in FIG. 6).

As can be seen in FIGS. 6 and 7, due to the transparency of the semi-transparent film 302, the operator 150 is able to simultaneously visualize both the images and/or video stream reflected by the semi-transparent film 302 and the environment external to the front of vehicle 202 through the semi-transparent film 302. As a result, the operator 150 is able to more safely operate the vehicle 202 by maintaining his or her view of the front of the vehicle 202 while simultaneously monitoring the collection of refuse from the refuse container 230 using images and/or video reflected by the semi-transparent film 302.

Figure 5:
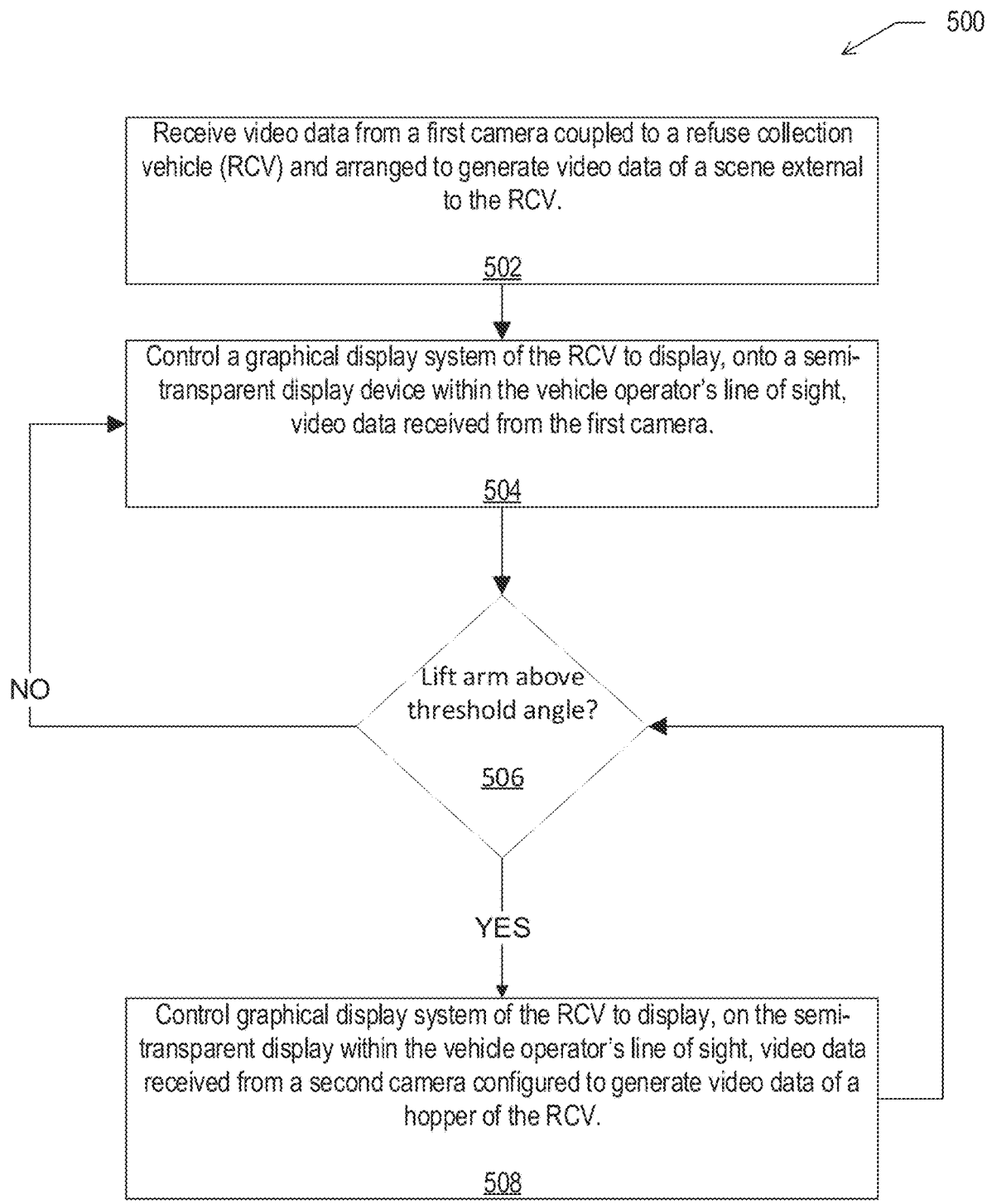
FIG. 5 depicts a flow diagram of an example process for displaying video data on the graphical display system of FIGS. 3 and 4.

FIG. 5 depicts an example process 500 for monitoring collection of refuse by a refuse collection vehicle.

Video data, such as a video stream, is received from a first camera coupled to the refuse collection vehicle and arranged to generate video data of a scene external to the side of the vehicle (502). For example, an onboard computing device 232 (such as computing device 132 of FIG. 1) receives, in real time, a video stream generated by a first camera 234 located on a side of the vehicle 202. In some implementations, the video data generated by the first camera 234 is received in response to detecting that the grabber 206 of the vehicle 202 is positioned proximate a refuse container 230. For example, the video data generated by the first camera 234 can be received by the onboard computing device 232 of the vehicle 202 in response to receiving a signal from one or more of the container detection sensors 214, 216 indicating the presence of a refuse container 230 proximate the vehicle 202. In some implementations, the video data generated by the first camera 234 is received by the onboard computing device 232 in response to initiation of a dump cycle. For example, the video data generated by the first camera 234 can be received by the onboard computing device 232 of the vehicle 202 in response to an operator 150 of the vehicle 202 initiating a dump cycle using a controller 215.

The onboard computing device 232 controls a graphical display system of the vehicle to display, on a semi-transparent display device within the vehicle operator's line of sight, the video data received from the first camera (504). For example, referring to FIGS. 4 and 6, the onboard computing device 232 can stream, in real time, the video data received from the first camera 234 to a monitor 304 of the graphical display system 220 (e.g., via an onboard computing device 232 of the vehicle 202). The monitor 304 can then displays the video stream generated by the first camera 234, and as the monitor 304 displays the video stream, the semi-transparent film 302 attached to the windshield 238 of the vehicle 202 reflects the displayed video stream. For example, as can be seen in FIG. 6, the video stream generated by the first camera 234 depicts the side of the vehicle 202, including the grabber 206 of the vehicle 202 and a refuse container 230 to be serviced by the vehicle 202. This video stream is displayed in real time by the monitor 304 and reflected by the semi-transparent film 302 positioned within the operator's forward-facing line of sight 310. As a result, the video stream is presented to the operator 150 within his or her line of sight 310 when the operator 150 is facing forward and looking through the windshield 238 of the vehicle. Because the film 302 is semi-transparent, the operator 150 can simultaneously monitor the video stream reflected by the semi-transparent film 302 while maintaining his or her view of the external environment to the front of the vehicle through the semi-transparent film 302.

As video data is displayed in real time by the graphical display system 220, the onboard computing device 232 determines whether a lift arm of the vehicle is above a threshold angle (506). For example, while the video stream received from the first camera 234 is being displayed by the graphical display system 220, the onboard computing device 232 can receive signals from the arm position sensor 212 indicating the current position of the lift arm 204. Based on the signals received from the arm position sensor 212, the onboard computing device 232 can determine whether the lift arm 204 of the vehicle 202 is above a threshold angle relative to the surface on which the vehicle 202 is positioned (e.g., the road surface). In some implementations, the threshold angle corresponds to an angle of the lift arm 204 at which contents of the refuse container 230 engaged by the grabber 206 are being dumped into the hopper 210 (e.g., as depicted in FIG. 2C). In some implementations, the threshold angle corresponds to the angle of the lift arm 204 at which a refuse container 230 engaged by the lift arm is in view of the second camera 236 on top of the vehicle 202.

If it is determined that the lift arm of the vehicle is below the threshold angle (e.g., as depicted in FIGS. 2A and 2B), the video data received from the first camera 234 continues to be displayed by the graphical display system 220, as depicted in FIG. 6.

However, if it is determined that the lift arm of the vehicle is above the threshold angle, the onboard computing device 232 controls the graphical display system of the vehicle to display, on the semi-transparent display device within the vehicle operator's line of sight, video data received from a second camera that is configured to generate video data of a hopper of the vehicle (508). For example, referring to FIGS. 4 and 7, in response to determining that the angle of the lift arm 204 is above the threshold angle, the onboard computing device 232 can stream, in real time to the monitor 304 of the graphical display system 220, the video data received from the second camera 236 positioned on the top of the vehicle 202. As the monitor 304 displays the video stream generated by the second camera 236, the semi-transparent film 302 on the windshield 238 reflects the displayed video stream. For example, as can be seen in FIG. 7, the video stream generated by the second camera 236 depicts the top of the vehicle 202, including the hopper 210 of the vehicle 202 and any refuse being dumped from the refuse container 230 into the vehicle 202. This video stream is displayed in real time by the monitor 304 and reflected by the semi-transparent film 302 within the operator's line of sight 310. As a result, the video stream is presented in real time to the operator 150 within his or her line of sight 310 when the operator 150 is facing forward and looking through the windshield 238 of the vehicle. Because the film 302 reflecting the video stream is semi-transparent, the operator 150 can monitor the video stream generated by the second camera 236 and reflected by the semi-transparent film 302 while simultaneously maintaining his or her view of the external environment to the front of the vehicle 202 through the semi-transparent film 302.

If, while the video data generated by the second camera 236 is being displayed by the graphical display system 220, it determined that the lift arm 204 of the vehicle 202 is below the threshold angle, the video data displayed by the graphical display system 220 is automatically switched to video data generated by the first camera 234. For example, after dumping contents of the refuse container 230 into the hopper 210, the lift arm 204 is lowered in order to lower the refuse container 230 to the ground (or onto whatever surface the refuse container 230 was original placed). As the lift arm 204 lowers the refuse container 230, the angle of the lift arm 204 falls below the threshold angle, as detected by sensor 212. In response to receiving a signal from sensor 212 indicating that the angle of the lift arm 204 is below the threshold angle, the onboard computing device 232 controls the graphical display system 220 to switch from displaying the video stream generated by the second camera 236 (as depicted in FIG. 7) back to displaying the video stream generated by the first camera 234 (as depicted in FIG. 6). As a result, the operator 150 is able to use the reflection of the video stream in the semi-transparent film 302 to monitor the lift arm 204 lowering the refuse container 230 and the grabber 206 releasing the refuse container 230 to ensure proper placement and release of the refuse container 230, while simultaneously maintaining his or her view of the external environment to the front of the vehicle 202 through the semi-transparent film 302.

In Ir some implementations, the onboard computing device 232 controls the graphical display system 220 to stop displaying video data in response to receiving a signal indicating that a grabber of the refuse collection vehicle has released the refuse container. For example, as previously discussed, the vehicle can include container detection sensors 214, 216 arranged on the vehicle 202 to detect the presence and position of a refuse container 230. In some implementations, once the grabber 206 has released the refuse container 230 at the end of the dump cycle, the onboard computing device 232 receives a signal from one or more of the container detection sensors 214, 216 indicating that the refuse container has been released. In response, the onboard computing system can control the graphical display system 220 to stop displaying images and/or video data. In some implementations, the onboard computing device 232 controls the graphical display system 220 to stop displaying images and/or video data in response to receiving a signal from a sensor indicating that refuse collection vehicle 202 is no longer in proximity to a refuse container 230. As a result, no images or video data are displayed on the semi-transparent film 302 when the vehicle is not located proximate a refuse container to be serviced (e.g., when the vehicle 202 is driving between service locations).

Figure 8:
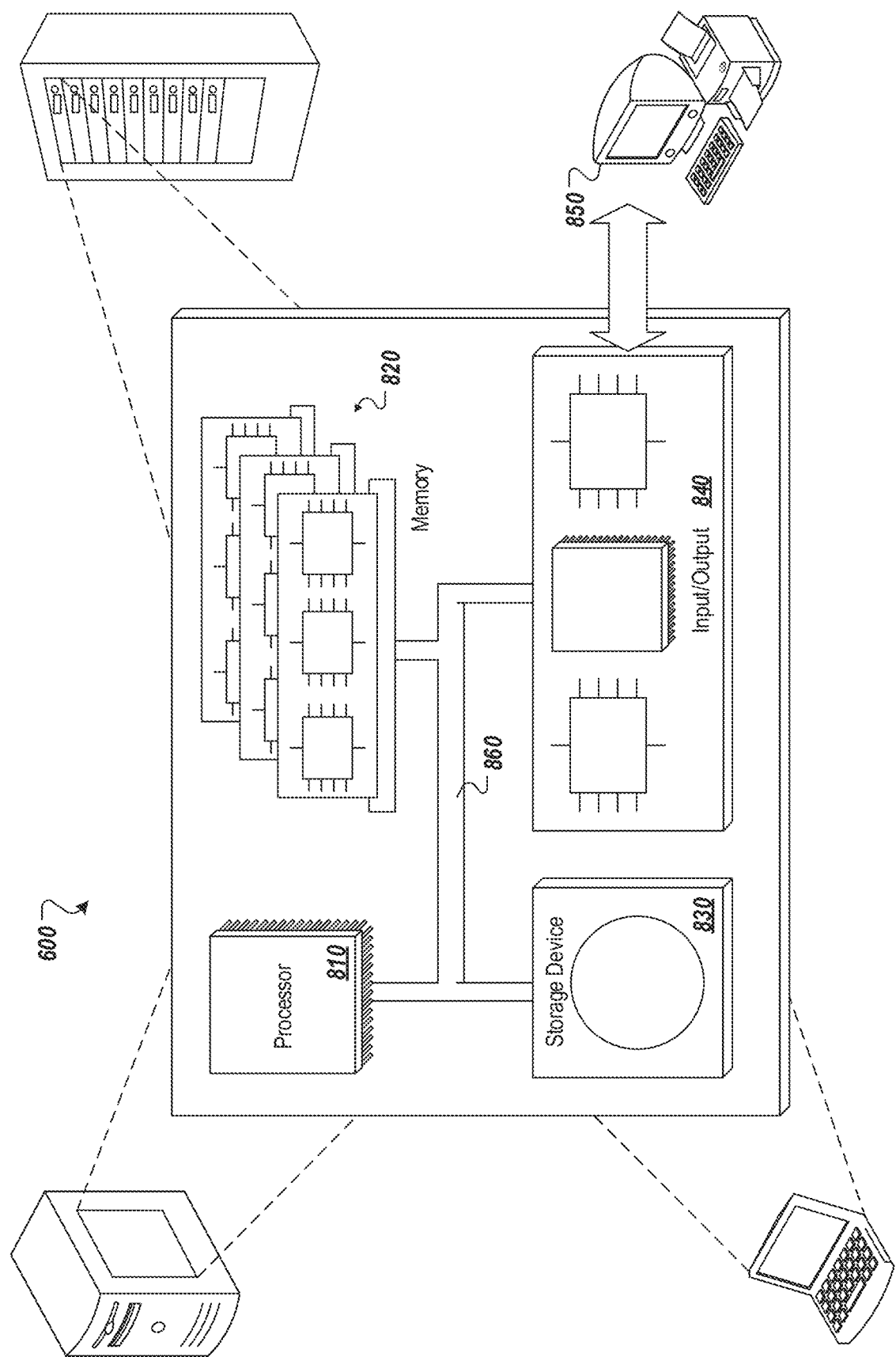
FIG. 8 depicts an example computing system, according to implementations of the present disclosure.

FIG. 8 depicts an example computing system, according to implementations of the present disclosure. The system 800 may be used for any of the operations described with respect to the various implementations discussed herein. For example, the system 800 may be included, at least in part, in one or more of the onboard computing device 132, 232 and/or other computing device(s) or system(s) described herein. The system 800 may include one or more processors 810, a memory 820, one or more storage devices 830, and one or more input/output (I/O) devices 850 controllable via one or more I/O interfaces 840. The various components 810, 820, 830, 840, or 850 may be interconnected via at least one system bus 860, which may enable the transfer of data between the various modules and components of the system 800.

The processor(s) 810 may be configured to process instructions for execution within the system 800. The processor(s) 810 may include single-threaded processor(s), multi-threaded processor(s), or both. The processor(s) 810 may be configured to process instructions stored in the memory 820 or on the storage device(s) 830. For example, the processor(s) 810 may execute instructions for the various software module(s) described herein. The processor(s) 810 may include hardware-based processor(s) each including one or more cores. The processor(s) 810 may include general purpose processor(s), special purpose processor(s), or both.

The memory 820 may store information within the system 800. In some implementations, the memory 820 includes one or more computer-readable media. The memory 820 may include any number of volatile memory units, any number of non-volatile memory units, or both volatile and non-volatile memory units. The memory 820 may include read-only memory, random access memory, or both. In some examples, the memory 820 may be employed as active or physical memory by one or more executing software modules.

The storage device(s) 830 may be configured to provide (e.g., persistent) mass storage for the system 800. In some implementations, the storage device(s) 830 may include one or more computer-readable media. For example, the storage device(s) 830 may include a floppy disk device, a hard disk device, an optical disk device, or a tape device. The storage device(s) 830 may include read-only memory, random access memory, or both. The storage device(s) 830 may include one or more of an internal hard drive, an external hard drive, or a removable drive.

One or both of the memory 820 or the storage device(s) 830 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 800. In some implementations, the CRSM may include a data store that provides storage of computer-readable instructions or other information in a non-transitory format. The CRSM may be incorporated into the system 800 or may be external with respect to the system 800. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 810 and the memory 820 may be supplemented by, or incorporated into, one or more application-specific integrated circuits (ASICs).

The system 800 may include one or more I/O devices 850. The I/O device(s) 850 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 850 may also include one or more output devices such as a display, LED(s), an audio output device (e.g., a speaker), a printer, a haptic output device, and so forth. The I/O device(s) 850 may be physically incorporated in one or more computing devices of the system 800, or may be external with respect to one or more computing devices of the system 800.

The system 800 may include one or more I/O interfaces 840 to enable components or modules of the system 800 to control, interface with, or otherwise communicate with the I/O device(s) 850. The I/O interface(s) 840 may enable information to be transferred in or out of the system 800, or between components of the system 800, through serial communication, parallel communication, or other types of communication. For example, the I/O interface(s) 840 may comply with a version of the RS-232 standard for serial ports, or with a version of the IEEE 1284 standard for parallel ports. As another example, the I/O interface(s) 840 may be configured to provide a connection over Universal Serial Bus (USB) or Ethernet. In some examples, the I/O interface(s) 840 may be configured to provide a serial connection that is compliant with a version of the IEEE 1394 standard.

The I/O interface(s) 840 may also include one or more network interfaces that enable communications between computing devices in the system 800, or between the system 800 and other network-connected computing systems. The network interface(s) may include one or more network interface controllers (NICs) or other types of transceiver devices configured to send and receive communications over one or more communication networks using any network protocol.

Computing devices of the system 800 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 800 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

While certain embodiments have been described, other embodiment are possible.

For example, while the graphical display system 120, 220 is depicted as including a semi-transparent film 302 and monitor 304, other display systems can be utilized. For example, in some implementations, the graphical display system 220 includes electronic glasses device worn by an operator 150 of the vehicle 202 and the images and/or video captured by the camera(s) 234, 236 are displayed on the lens of the electronic glasses device, and, as a result, the images and/or video are displayed within the operator's line of sight. Similarly, in some implementations, the graphical display system 220 includes electronic contact devices worn by an operator 150 of the vehicle 202 and the images and/or video captured by the camera(s) 234, 236 are displayed on the lens of the electronic contacts and, as a result, the images and/or video are displayed within the operator's line of sight.

In addition, although examples herein may show and/or describe implementations for particular types of RCVs, implementations are not limited to these examples. The structures and/or methods described herein can apply to any suitable type of RCV, including front-loader, rear-loader, side-loader, roll-off, and so forth, with or without Curotto-Can™, carry can, and so forth.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claim(s).

What is claimed is:

1. A refuse collection vehicle comprising:
    a grabber that is operable to engage a refuse container;
    a lift arm coupled to the grabber and operable to raise and lower the grabber;
    a camera that is arranged to generate image data of a scene external to the refuse collection vehicle;
    a sensor configured to detect an operational state of the grabber; and
    a display system configured to:
        display at least a portion of the image data generated by the camera within a forward line of sight of an operator of the refuse collection vehicle; and
        stop displaying, based on the operational state of the grabber, the at least a portion of the image data, wherein:
            the sensor being configured to detect an operational state of the grabber comprises the sensor being configured to detect when the grabber has released the refuse container; and
            to stop displaying, based on the operational state of the grabber, the at least a portion of the image data, the display system is configured to stop displaying the at least a portion of the image data in response to the sensor detecting that the grabber has released the refuse container.

2. The refuse collection vehicle of claim 1, wherein the at least a portion of the image data comprises video.

3. The refuse collection vehicle of claim 1, wherein the at least a portion of the image data comprises one or more images.

4. The refuse collection vehicle of claim 1, wherein the at least a portion of the image data is generated by the camera while the refuse collection vehicle is performing a dump cycle, and wherein the at least a portion of the image data is displayed in real time.

5. The refuse collection vehicle of claim 1, wherein the sensor is a mechanical sensor configured to detect one or more physical parameters associated with the grabber.

6. The refuse collection vehicle of claim 1, wherein:
    the camera is a first camera configured to generate first image data of a side of the refuse collection vehicle; and
    the refuse collection vehicle further comprises:
        a second camera configured to generate second image data of a hopper of the refuse collection vehicle; and
        a second sensor configured to detect a lift angle of the lift arm of the refuse collection vehicle.

7. The refuse collection vehicle of claim 6, configured such that:
    when the second sensor detects that the lift arm of the refuse collection vehicle is below a threshold angle, the display system displays at least a portion of the first image data within the forward line of sight of the operator; and
    when the second sensor detects that the lift arm of the refuse collection vehicle is above the threshold angle, the display system displays at least a portion of the second image data within the forward line of sight of the operator.

8. The refuse collection vehicle of claim 1, further comprising:
    a second sensor;
    wherein the display system is further configured to start displaying the at least a portion of the image data in response to the second sensor indicating that the refuse collection vehicle is proximate the refuse container.

9. The refuse collection vehicle of claim 1, wherein the display system comprises a semi-transparent display device attached to a windshield of the refuse collection vehicle.

10. A method of operating a refuse collection vehicle to collect refuse from a refuse container, the method comprising:
    receiving image data from a camera coupled to the refuse collection vehicle and arranged to generate video data of a scene external to the refuse collection vehicle;
    controlling a display system of the refuse collection vehicle to display at least a portion of the image data received from the camera within a forward line of sight of an operator of the refuse collection vehicle;
    receiving a signal from a sensor indicating an operational state of a grabber of the refuse collection vehicle, the grabber being operable to engage a refuse container, wherein the receiving a signal from the sensor comprises receiving a signal indicating that the grabber has released the refuse container; and
    causing, based on the operational state of the grabber indicated by the signal from the sensor, the display system to stop displaying the at least a portion of the image data, wherein the causing the display system to stop displaying the at least a portion of the image data comprises causing the display system to stop displaying the at least a portion of the image data in response to receiving the signal indicating that the grabber has released the refuse container.

11. The method of claim 10, wherein the at least a portion of the image data comprises video.

12. The method of claim 10, wherein the at least a portion of the image data comprises one or more images.

13. The method of claim 10, wherein the at least a portion of the image data is received from the camera and displayed in response to receiving one or more signals indicating that the refuse collection vehicle is initiating a dump cycle.

14. The method of claim 10, wherein:
    the camera is a first camera configured to generate first image data of a side of the refuse collection vehicle, the first image data depicting the grabber of the refuse collection vehicle engaging the refuse container; and
    the controlling the display system to display the at least a portion of the image data comprises controlling the display system to display the first image data depicting the grabber of the refuse collection vehicle engaging the refuse container.

15. The method of claim 14, further comprising:

receiving a second signal from a second sensor indicating that an angle of a lift arm of the refuse collection vehicle is above a threshold angle; and in response to receiving the second signal, causing the display system to display second image data generated by a second camera arranged to generate image data of a hopper of the refuse collection vehicle, wherein the second image data depicts contents of the refuse container being dumped into the hopper of the refuse collection vehicle.

16. The method of claim 15, further comprising:

receiving a third signal from the second sensor, the third signal indicating that the angle of the lift arm of the refuse collection vehicle is below the threshold angle; and in response to receiving the third signal, causing the display system to display third image data generated by the first camera, wherein the third image data depicts the refuse container being lowered by the lift arm and released by the grabber.

17. The method of claim 10, wherein controlling the display system of the refuse collection vehicle to display the at least a portion of the image data comprises:

receiving a second signal from a second sensor indicating that the refuse collection vehicle is proximate the refuse container; and in response receiving the second signal, causing the display system to start displaying the at least a portion of the image data.

18. The method of claim 10, wherein the display system comprises a semi-transparent display device attached to a windshield of the refuse collection vehicle.

* * * * *